(No Model.)
F. BEITLER.
BICYCLE BRAKE.
No. 592,271. Patented Oct. 26, 1897.
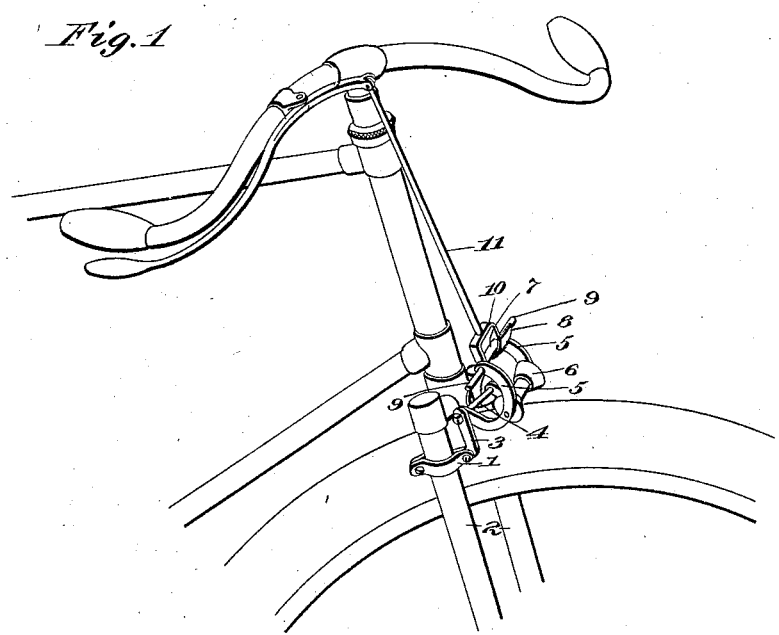
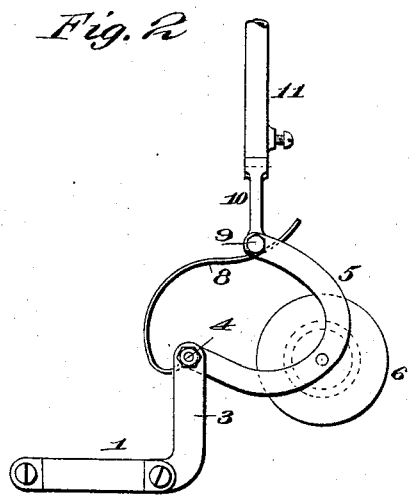
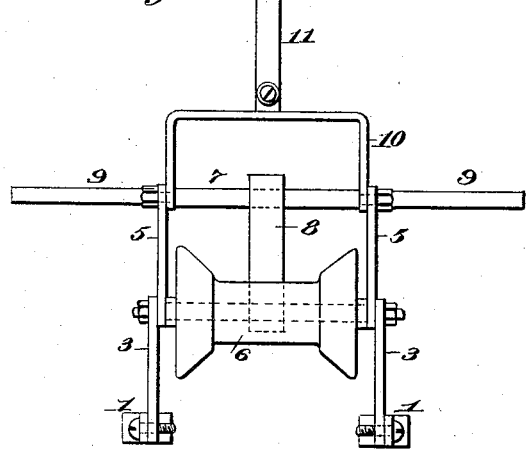
Witnesses.
Inventor,
Frederick Beitler,
by John Wedderburn
Atty.

UNITED STATES PATENT OFFICE.

FREDERICK BEITLER, OF PITTSBURG, PENNSYLVANIA.

BICYCLE-BRAKE.

SPECIFICATION forming part of Letters Patent No. 592,271, dated October 26, 1897.

Application filed June 22, 1896. Serial No. 596,458. (No model.)

*To all whom it may concern:*

Be it known that I, FREDERICK BEITLER, a citizen of the United States, residing at Pittsburg, in the county of Allegheny and State of Pennsylvania, have invented certain new and useful Improvements in Bicycle-Brakes; and I do hereby declare the following to be a full, clear, and exact description of the invention, such as will enable others skilled in the art to which it appertains to make and use the same.

My invention relates to certain new and useful improvements in bicycle-brakes, the object of the same being to provide a brake of this character which is effective in operation and which will not rub and wear out the tire of the bicycle.

The invention consists of a bracket adapted to be attached to the front forks of the bicycle, made up of a pair of arms having upturned outer ends and a rod or shaft connecting the same, U-shaped arms pivoted upon said rod or shaft, a roller mounted to rotate in said U-shaped arms, a leaf-spring attached to said rod or shaft and bearing against the under side of a cross-bar connecting the upper ends of said U-shaped arms, and pivotal connections between said cross-bar and the brake-operating rod.

The invention also consists in other details of construction and combinations of parts, which will be hereinafter more fully described and claimed.

In the drawings forming part of this specification, Figure 1 represents a perspective view of my device shown applied to a bicycle. Fig. 2 is a side elevation of the same. Fig. 3 is a front elevation.

Like reference-numerals indicate like parts in the different views.

My improved brake attachment is made up of a pair of arms 1 1, adapted to be clamped or otherwise secured to the front forks 2 of the bicycle and having upturned outer ends 3, which are connected by a rod or shaft 4. Pivoted to the rod 4 and extending outwardly therefrom is a pair of parallel U-shaped arms 5 5, in which is mounted for rotation a spool-shaped roller 6, preferably made of rubber or other yielding material. The arms 5 are connected at their extreme outer ends by a cross-bar 7, the under side of which is engaged by a leaf-spring 8, secured to the rod or shaft 4. The said arms are also provided with studs or projections 9 9, by means of which the brake may be operated by foot. Pivotally connected to the cross-bar 7 is a yoke-shaped piece 10, which is directly attached to the brake-operating rod 11, extending upwardly and connected to the brake-lever adjacent to the handle-bars of the bicycle.

As thus constructed it will be seen that the arms 5, carrying the roller 6, are normally held in raised position out of contact with the tire of the wheel by means of the leaf-spring 8. When it is desired to operate the same to bring the roller 6 into engagement with the rim or tire of the wheel, the operating-rod 11 is pressed downward in the usual manner or the U-shaped arms 5 are depressed by the engagement of the feet with the studs or projections 9 on said arm, forcing said roller 6 downwardly and then rearwardly in close engagement with the tire of the wheel. Rubbing and consequent wearing of the tire is prevented by reason of the fact that the roller 6 rotates, but a pressure upon the tire is attained which is sufficient to stop the rotation of the wheel almost immediately.

Having now described my invention, what I claim as new, and desire to secure by Letters Patent, is—

The combination with a bicycle-frame, of a bracket secured to the front fork thereof and comprising a pair of parallel arms having upturned forward ends, a rod connecting said ends, a pair of substantially U-shaped parallel arms having one end pivoted upon said rod, a roller mounted for rotation between the U-shaped arms near their center, a cross-bar connecting the other ends of said arms, a spring mounted on the pivot of said U-shaped arms and bearing against said cross-bar, a yoke-shaped piece pivotally connected to said cross-bar and connected directly with the brake-operating rod, the other end of which is pivotally connected with the brake-lever, all substantially as described.

In testimony whereof I have signed this specification in the presence of two subscribing witnesses.

FREDERICK BEITLER.

Witnesses:
HARRY BLACKFORD,
JOHN HOFFMANN, Jr.